United States Patent
Chen et al.

(10) Patent No.: US 10,135,503 B2
(45) Date of Patent: Nov. 20, 2018

(54) DETECTION OF SPATIALLY MULTIPLEXED SIGNALS FOR OVER-DETERMINED MIMO SYSTEMS

(71) Applicant: ZTE Canada Inc., Toronto (CA)

(72) Inventors: Dayong Chen, Kitchener (CA); Yiwen Liu, Waterloo (CA)

(73) Assignee: ZTE Canada Inc., Toronto, Ontario (CA)

(*) Notice: Subject to any disclaimer, the term of this patent is extended or adjusted under 35 U.S.C. 154(b) by 0 days.

(21) Appl. No.: 15/410,506

(22) Filed: Jan. 19, 2017

(65) Prior Publication Data
US 2017/0207831 A1    Jul. 20, 2017

Related U.S. Application Data

(60) Provisional application No. 62/281,113, filed on Jan. 20, 2016.

(51) Int. Cl.
| | |
|---|---|
| *H04B 7/0413* | (2017.01) |
| *H04B 7/04* | (2017.01) |
| *H04L 25/02* | (2006.01) |
| *H04B 7/0456* | (2017.01) |

(52) U.S. Cl.
CPC ......... *H04B 7/0413* (2013.01); *H04B 7/0473* (2013.01); *H04L 25/0258* (2013.01)

(58) Field of Classification Search
CPC .......... H04B 7/02; H04B 7/0413; H04B 7/08; H04B 7/0802; H04B 7/0831; H04B 7/0854; H04B 7/0857; H04B 7/0473; H04L 25/024; H04L 25/0242; H04L 25/0244; H04L 25/025; H04L 25/0256; H04L 25/0258
USPC ....... 375/259, 260, 267, 285, 324, 340, 341, 375/346, 348; 370/208, 310
See application file for complete search history.

(56) References Cited

U.S. PATENT DOCUMENTS

| | | | | |
|---|---|---|---|---|
| 8,903,027 B1* | 12/2014 | Wu | .................. | H04L 25/03242 375/341 |
| 2007/0116143 A1* | 5/2007 | Bjerke | .................... | H04L 1/005 375/262 |
| 2008/0279299 A1* | 11/2008 | Reuven | ............. | H04L 25/03318 375/267 |
| 2010/0124301 A1* | 5/2010 | Bahng | ................... | H04L 1/0656 375/341 |
| 2017/0187433 A1* | 6/2017 | Khsiba | ................. | H04B 7/0413 |

\* cited by examiner

*Primary Examiner* — Young T Tse
(74) *Attorney, Agent, or Firm* — Perkins Coie LLP (57) ABSTRACT

Method and apparatus of obtaining better detection performance by improving matrix condition for an M×N over-determined MIMO system are disclosed. The condition of a matrix to be inverted for solving various detection problems is improved by reordering equations of the original MIMO system, resulting in a reordered channel matrix and reordered received signal vector so that the top N×N sub-matrix has the largest determinant among all N×N sub-matrices of the reordered channel matrix. The disclosed method may be used to obtain a more accurate estimate of the transmit data bits.

19 Claims, 9 Drawing Sheets

DETECTION OF SPATIALLY MULTIPLEXED SIGNALS FOR OVER-DETERMINED MIMO SYSTEMS

CROSS REFERENCE TO RELATED APPLICATIONS

This patent document claims the benefit of priority of U.S. Provisional Patent Application No. 62/281,113, filed on Jan. 20, 2016. The entire content of the before-mentioned patent application is incorporated by reference as part of the disclosure of this document.

TECHNICAL FIELD

The invention relates to digital wireless communication, and particularly to a method and apparatus for improving multi-input, multi-output (MIMO) detection performance by improving matrix condition for over-determined MIMO systems.

BACKGROUND

Recent years has seen a significant growth in wireless communication. As the number of wireless devices and applications running on the wireless devices goes up, so does the demand for data bandwidth in wireless communication networks. To meet this growing demand for high performance wireless devices and networks, complexity of next generation wireless networks and devices is expected to significantly increase over the currently deployed wireless devices.

SUMMARY

Techniques for obtaining better detection performance of a wireless receiver in an over-determined MIMO receiving operation by improving condition of a channel matrix prior to its inversion are disclosed.

In one example aspect, a method implemented at a wireless receiver having multiple receiver antennas for processing a wireless signal transmission received at the multiple receiver antennas to recover transmitted data bits is disclosed. The method includes generating an equivalent channel matrix representative of a channel over which the wireless signal transmission has traveled, selecting a signal detection scheme for use in recovering the transmitted data bits from the wireless signal transmission, deciding, selectively based on the selected signal detection scheme, an overdetermined condition for the wireless signal transmission such that the wireless signal transmission comprises fewer layers of transmission than a number of the multiple receiver antennas, reordering, when the wireless signal transmission is decided to be overdetermined, the equivalent channel matrix to generate a reordered channel matrix that is better conditioned for inversion than the equivalent channel matrix, analytically inverting the reordered channel matrix to generate a mathematically equivalent and a numerically better conditioned new zero-forcing (ZF) equation, and computing estimates of transmitted data bits using the new ZF equation. The method may be embodied into instructions that are stored in a memory of a wireless receiver fitted with multiple receiver antennas and a processor that can execute the instructions to implement the method.

In another example aspect, an apparatus for processing a spatially multiplexed signal is disclosed. The apparatus includes an equivalent channel matrix generator having an input interface and an output interface, wherein, at the input interface, wherein the equivalent channel matrix generator is enabled to receive a multiple-input-multiple-output (MIMO) propagation channel matrix F and a pre-coder matrix W, and wherein, at the output interface, the equivalent channel matrix generator is enabled to output a channel matrix representing a result of multiplication of the MIMO propagation channel matrix F with the pre-coder matrix W. The apparatus includes a detection control unit having an input interface and an output interface wherein the input interface of the detection control unit is coupled to the output interface of the equivalent channel matrix generator, and wherein the output interface of the detection control unit is coupled to a switch, wherein the output interface is enabled to include a first signal that toggles the switch, depending on a transmission rank and a number of receiver antennas, to simultaneously connect outputs of the switch between an input interface of a conventional detection module and an input interface of a reordering unit. The apparatus includes a reordering unit having an input interface coupled to the output interface of the detection control unit through the switch, and an output interface that is enabled to output a reordered channel matrix and a reordered received symbol vector. The apparatus includes a conventional detection unit having an input interface coupled to a second set of outputs of the switch and an output interface enabled to output detection results that are calculated based on one of a maximum likelihood (ML) detection, linear detection, or non-linear detection. The apparatus includes a matrix calculator having an input interface coupled to the output interface of the reordering unit, and an output interface that is enabled to carry inversion results for the reordered channel matrix and the reordered received symbol vector. The apparatus includes a linear solver having an input interface coupled to the output interface of the matrix calculator, and an output interface enabled to carry estimates of transmitted symbols obtained by an optimized zero-forcing algorithm.

These, and other, aspects are disclosed in the present document.

DETAILED DESCRIPTION

MIMO has become one of the most important paradigms for modern broadband communication systems by offering capacity increase through spatial multiplexing. While the technology used for spatial multiplexing transmission is typically relatively simple and straightforward, receiver-side processing to recover data bits from the spatially multiplexed signal is more difficult. The spatial domain multiplexing is sometimes measured as "layers" of transmission. A layer may refer to a spatially multiplexed channel. The number of layers in a transmission emanating from multiple transmission antennas is less than or equal to the number of antenna ports, where an antenna port represents a logical grouping of physical antennas for transmitting on a spatially multiplexed channel.

The receiver may have to separate the multiple transmitted data streams or layers using a signal detection technique such as linear detection, non-linear detection or maximum likelihood detection. Among these detection techniques, linear detection is particularly attractive due to its low complexity and power consumption. A linear detection method can be a zero-forcing (ZF) method or a minimum mean-squared error (MMSE) method. The ZF method removes the effect of channel matrix on the transmitted signal layers without considering the effect of possible noise enhancement. The MMSE method improves the ZF detection performance by making an optimum trade-off between the interference between the transmitted layers and the noise enhancement by minimizing the mean squared error between the detected signal vector and the actual transmitted signal. Whether ZF or MMSE is used, however, linear detection suffers from noise enhancement caused by inverting ill-conditioned matrix since at high signal-to-noise ratios (SNRs), the MMSE detection is asymptotically the same as ZF equation. Considering the importance of linear detection for a variety of applications, including applications in iterative and non-iterative successive interference cancellation (SIC) receiver, it is desirable to improve the detection performance by improving the condition of the matrix before it is inverted.

In ZF detection, an inverse of an estimated channel matrix is multiplied by the received signal to obtain an estimate of the transmitted signal. The performance and numerical stability of ZF detection thus depends on how amenable the estimated channel matrix for inversion.

The present document discloses, among other things, methods and apparatus of obtaining better linear or non-linear detection performance by improving matrix condition for an overdetermined MIMO system. A mathematical representation of an over-determined system may include a M×N channel matrix representing (M represents the received signals or number of receive antennas whereas N represents the number of transmitted layers) the channel and the received signal may be represented as $\tilde{y}=\tilde{H}x+\tilde{n}$, where $\tilde{y}$ represents received signal, $\tilde{H}$ represents the channel matrix, x represents transmitted signal and $\tilde{n}$ represents noise impairment.

In some embodiments, the condition of matrix $\tilde{H}^H\tilde{H}$, which is inverted for solving various detection problems, is improved by reordering the M equations of the original MIMO system, resulting in a reordered channel matrix H and reordered received signal vector y so that the N×N sub-matrix $H_1$, which corresponds to the first N rows of H, has the largest determinant among all N×N sub-matrices of H, partitioning the reordered channel matrix into $H_1$ and $H_2$, and partitioning the reordered received signal vector y into $y_1$ and $y_2$, forming ZF equation in terms of the partitioned channel matrix and partitioned received signal vector, analytically multiplying both sides of the ZF equation by $(H_1^H)^{-1}$ to improve the condition of the ZF equation, and solving the ZF equation to obtain a more accurate estimate of the transmit symbol vector. A ZF equation is in the form $(H^H)x=H^Hy$ where the N×N square matrix $H^HH$ is to be inverted and the condition of the square matrix is more ill-conditioned if the MIMO channel experiences significant spatial correlation. However, if the channel is over-determined then there exists method to improve the condition of the ZF equation by pre-processing as is disclosed in the present document.

In some embodiments, a MIMO receiver implementing the improved detection method comprises a channel matrix generator to generate equivalent channel matrix between the M received signals and N transmitted layers, a detection control unit which determines whether a modified detection circuit or conventional detection circuit should be used for detecting the current received MIMO signal, a matrix processor which computes the matrices used to solve a better-conditioned ZF equation and linear solver for solving the ZF equation.

One benefit of MIMO is that it allows spatial multiplexing in which N (N>1) multiple independent data streams or layers are simultaneously transmitted and then received by a receiver with M receive antennas. The received baseband MIMO signal $\tilde{y}=[y_1, y_2, \ldots y_M]^T$ can be modeled as $$\tilde{y}=\tilde{H}x+\tilde{n} \qquad \text{Eq. (1)}$$

where $\tilde{H}$ is the equivalent channel matrix between N transmitted layers and M received signals, $x=[x_1, x_2, \ldots x_N]^T$ is the transmitted symbol vector with $x_i$, $i=1, 2, \ldots N$ being a complex symbol drawn from a modulation constellation and $n=[n_1, n_2, \ldots n_M]^T$ is a symmetric zero-mean complex-valued AWGN (independent and identically distributed additive white Gaussian noise) vector with variance $\sigma^2$ with complex normal distribution $n \sim CN(0,\sigma^2 I_M)$ (N and M integers). Each $x_i$, corresponds to a vector $c_i$, of Q binary bits $c_i=[c_{i1}, c_{i2}, \ldots c_{iQ}]$ where Q is the number of bits per symbol that can be carried by each symbol of the constellation. The $c_{ij}$ s are code bits of a codeword. The receiver demodulates the received signal to produce estimates of a posteriori log-likelihood ratios (APP LLRs) of the code bits and passes the LLRs associated with a codeword to decoder to recover the information from the received signal.

To detect spatially multiplexed signals, the number of receive antennas M may be equal to or greater than the number of transmitted layers N. The former case (M=N) corresponds to a square MIMO system whereas the latter case (M>N) corresponds to an over-determined MIMO system which is frequently encountered in practical applications. For example, a Category 5 User Equipment (UE) in a Long Term Evolution LTE/LTE-Advanced system is equipped with 4 receive antennas which allows the UE to receive up to 4 layer signals. In many cases, however, radio propagation environment cannot support 4-layer transmission because some of the 4 eigen-modes of the MIMO channel are very small and/or the UE is located at a cell boarder with low signal to interference and noise ratio (SINR). In these cases, higher data throughput can be achieved if the base station concentrates transmission power to less than 4 layers, resulting in an over-determined MIMO system.

Spatially multiplexed signals can be detected by a receiver using a variety of different techniques such as maximum likelihood (ML) detection, linear detection or non-linear detection to obtain an estimate $\hat{x}$ of the transmit symbol vector x. An ML estimate $\hat{x}_{ML}$ is obtained by searching over all possible transmit symbol vectors so that the Euclidean Distance between the received signal $\tilde{y}$ and a scaled hypothesized transmit symbol vector $\tilde{H}\hat{x}$ is minimized. A linear $\hat{x}_{Lin}$ estimate is obtained by multiplying the received signal vector by a weight matrix $\hat{x}_{Lin}=Wy$ where the weight matrix W can be designed based on either ZF or MMSE criterion. A non-linear detector applies ZF or MMSE detection to successively detect transmitted layers, with interference cancellation in between, so that the remaining layer(s) can be detected with reduced interference from the already detected layers.

Even though ML detection typically achieves optimum performance, its computational complexity is a major drawback for practical implementation. In comparison, linear detection is very attractive due to its low complexity and power consumption. The importance of linear detection goes beyond linear detection itself since it is also used for iterative and non-iterative successive interference cancellation (SIC) receiver. The use of linear detection in an iterative SIC receiver, which performs multiple iterations of detection and decoding, is attractive because the complexity of running both an ML detector and channel decoder multiple times is prohibitively high.

Unfortunately, the performance of linear detection can be severely degraded by potentially very large noise enhancement caused by inverting channel matrix that may be ill-conditioned. A ZF estimate $\hat{x}_{ZF}$ is obtained by solving the ZF-equation $$(\tilde{H}^H\tilde{H})\hat{x}_{ZF}=\tilde{H}^H y. \quad \text{Eq. (2)}$$

This results in $$\hat{x}_{ZF}=Wy=(\tilde{H}^H\tilde{H})^{-1}\tilde{H}^H y. \quad \text{Eq. (3)}$$

The condition, or numerical stability, or susceptibility to noise, of the ZF equation is determined by the condition of the N×N matrix $\tilde{H}^H\tilde{H}$ which is inverted. The condition of $\tilde{H}^H\tilde{H}$ in turn depends on the condition of channel matrix $\tilde{H}$. The channel matrix condition is determined by the degree of spatial correlation of MIMO channel. Due to limited spatial separation of physical antenna elements, such as in mobile handheld devices with small form factors, the MIMO channel is typically correlated which tends to give rise to ill-conditioned channel matrix.

An ill-conditioned channel matrix $\tilde{H}$ is near-singular with a small value of determinant, typically smaller than unity. If $\tilde{H}$ is ill-conditioned, then the matrix $\tilde{H}^H\tilde{H}$ which is to be inverted is even more ill-conditioned because the determinant of $\tilde{H}^H\tilde{H}$ is given by:

$$\det\tilde{H}^H\tilde{H}=|\det\tilde{H}|^2. \quad \text{Eq. (4)}$$

For example, if the determinant of $\tilde{H}$ is 0.1, then the determinant of $\tilde{H}^H\tilde{H}$ is equal to $0.1^2=0.01$, which is even more ill-conditioned.

If $\tilde{H}$ is over-determined, then the determinant of $\tilde{H}^H\tilde{H}$ is the sum of the squared determinants of all N×N sub-matrices $\tilde{H}^{(k)}$ of $\tilde{H}$:

$$\det\tilde{H}^H\tilde{H}=\sum_k\left|\det\tilde{H}_1^{(k)}\right|^2. \quad \text{Eq. (5)}$$

For example, a 3×2 over-determined channel matrix has six different 2×2 sub-matrices. Using r(i,j) to denote a sub-matrix consisting of row i and j, these six sub-matrices are r(1,2), r(2,1), r(1,3) r(3,1), r(2, 3) and r(3,2). If the largest determinant of these sub-matrices is much smaller than 1, then the determinant of $\tilde{H}^H\tilde{H}$ can be smaller or much smaller than the largest of the six determinants.

To explain the noise enhancement more clearly, $\hat{x}_{ZF}$ is written as the sum of a signal component and a post-detection noise component $$\begin{aligned}\hat{x}_{ZF} &= (\tilde{H}^H\tilde{H})^{-1}\tilde{H}^H y = \\ &= (\tilde{H}^H\tilde{H})^{-1}\tilde{H}^H(\tilde{H}x+\tilde{n}) \\ &= x+(\tilde{H}^H\tilde{H})^{-1}\tilde{H}^H\tilde{n} \\ &= x+\tilde{n}'.\end{aligned} \quad \text{Eq. (6)}$$

The signal component is x, which means the inter-layer interference is completely removed. However, the power level of post-detection noise $(\tilde{H}^H\tilde{H})^{-1}\tilde{H}^H\tilde{n}$ can be very high if $\tilde{H}^H\tilde{H}$ is ill-conditioned. This can be explained by applying singular value decomposition (SVD) of channel matrix $\tilde{H}=U\Sigma V^H$, where U and V are unitary $U^H U=I$ and $V^H V=I$, and $\Sigma$ is a diagonal matrix whose diagonal entries are ordered singular values of $\tilde{H}$ with $\sigma_1 \geq \sigma_2 \ldots \geq \sigma_N$. The post-detection noise power can be then written as:

$$\|\tilde{n}'\|^2=\|(\tilde{H}^H\tilde{H})^{-1}\tilde{H}^H\tilde{n}\|^2=\|V\Sigma^{-1}U^H\tilde{n}\|^2. \quad \text{Eq. (7)}$$

Since V is unitary, it doesn't affect noise statistics, i.e. $E\{\|V\Sigma^{-1}U^H\tilde{n}\|^2\}=E\{\|\Sigma^{-1}U^H\tilde{n}\|^2\}$ and so:

$$\begin{aligned}E\{\|\tilde{n}'\|^2\} &= E\{\|\Sigma^{-1}U^H\tilde{n}\|^2\} \\ &= E\{tr(\Sigma^{-1}U^H\tilde{n}\tilde{n}^H U\Sigma^{-1})\} \\ &= tr(\sigma^2\Sigma^{-2}) = \sigma^2 tr(\Sigma^{-2}) \\ &= \sum_{i=1}^{N}\frac{\sigma^2}{\sigma_i^2};\end{aligned} \quad \text{Eq. (8)}$$

where 'tr' denotes the trace operator. If $\tilde{H}$ is ill-conditioned, whether $\tilde{H}$ is square or over-determined, at least one of its singular values is very small which means the original noise is greatly enhanced, resulting in poor detection performance. If for example the two singular values of a 3×2 MIMO channel are $\sigma_1=0.2$ and $\sigma_2=0.1$, then the power of post-detection noise is $$E\{\|\tilde{n}'\|^2\}=\frac{\sigma^2}{0.2^2}+\frac{\sigma^2}{0.1^2}=125\sigma^2,$$

i.e. the noise power is magnified by 125 times.

An MMSE estimate $\hat{x}_{MMSE}$ is obtained by solving the equation.

$$(\tilde{H}^H\tilde{H}+\sigma^2 I_N)\hat{x}_{MMSE}=\tilde{H}^H y, \quad \text{Eq. (9)}$$

$$\hat{x}_{MMSE}=(\tilde{H}^H\tilde{H}+\sigma^2 I_N)^{-1}\tilde{H}^H y. \quad \text{Eq. (10)}$$

An MMSE detection algorithm typically has better performance than ZF detection because the matrix $(\tilde{H}^H\tilde{H}+\sigma^2 I_N)$ that is inverted is better conditioned than $\tilde{H}^H\tilde{H}$, due to the scaled identity matrix $\sigma^2 I_N$ being added to $\tilde{H}^H\tilde{H}$. However, at high SNR when $\sigma^2$ is small compared to $\tilde{H}^H\tilde{H}H$ the condition of matrix $(\tilde{H}^H\tilde{H}+\sigma^2 I_N)$ is approximately the same as that of $\tilde{H}^H\tilde{H}$ which means MMSE detection suffers from similar noise enhancement as ZF detection.

The description above shows that improving the condition of $\tilde{H}^H\tilde{H}$ matrix leads directly to improved detection performance. Due to the importance of linear detection for detecting spatially multiplexed MIMO signals, it is of particular interest to improve the condition of $\tilde{H}^H\tilde{H}$ matrix. If $\tilde{H}$ is square, the weight matrix $(\tilde{H}^H\tilde{H})^{-1}\tilde{H}$ is equal to $\tilde{H}^{-1}$ and the only way to improve the condition of $\tilde{H}$ is to use numerically stable algorithm to calculate $\tilde{H}^{-1}$. If $\tilde{H}$ is over-determined, then the condition of $\tilde{H}^H\tilde{H}$ can be improved more significantly.

In some embodiments, the condition of $\tilde{H}^H\tilde{H}$ can be improved for over-determined MIMO systems by reordering the M equations of an original MIMO system to generate a reordered channel matrix H and reordered received signal vector y so that the N×N sub-matrix $H_1$ corresponding to the first N rows of H has the largest determinant (of all determinants of the smaller matrices), partitioning the reordered channel matrix H into $H_1$ and $H_2$, partitioning the reordered received signal vector y into $y_1$ and $y_2$, re-writing the ZF equation in terms of the partitioned channel matrix and received vector, analytically multiplying both sides of the equation by $(H_1^H)^{-1}$ to obtain a better conditioned ZF equation, computing required matrices and solving the ZF equation to obtain a more accurate estimate of transmitted symbol vector.

In some embodiments, a MIMO receiver implementing the improved linear detection method comprises a channel matrix generator to generate an equivalent channel matrix $\tilde{H}$ using MIMO propagation channel matrix F and pre-coder matrix W as inputs, a detection control unit which determines whether the detection circuit according to the embodiments of the invention or conventional detection circuit should be used for detecting current received signal, a matrix processor which computes the matrices required for solving the better conditioned ZF equation and linear solver to solve the ZF equation.

Figure 1:
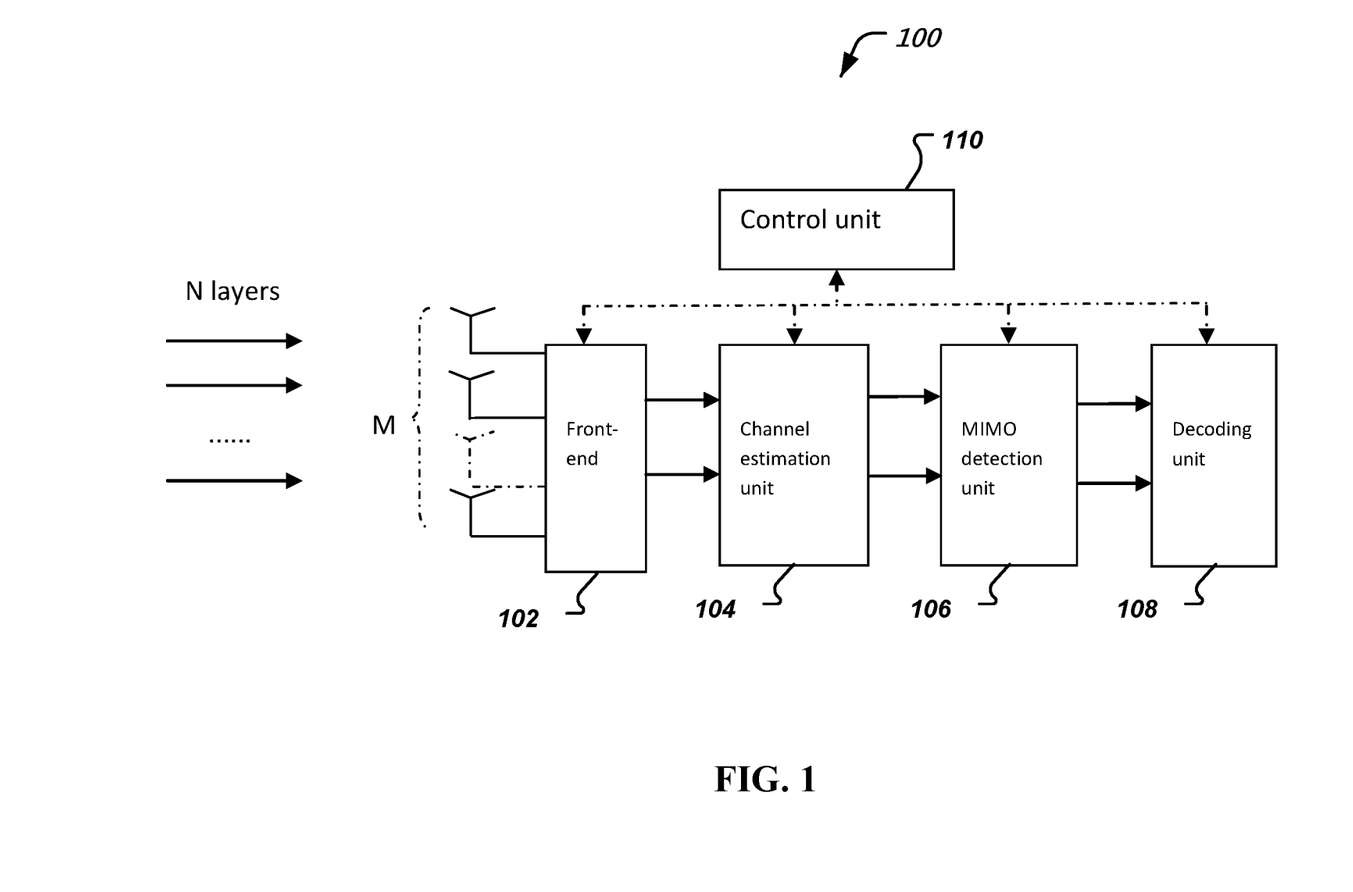
FIG. 1 shows an example block diagram of a spatial multiplexing detection embodiment under over-determined channel matrix.

FIG. 1 illustrates a block diagram of an exemplary wireless MIMO receiver 100 receiving N layers with M receive antennas. The receiver includes a frontend 102 which processes the received RF signal, by down-sampling, filtering and de-multiplexing, etc., so that the output signal from the frontend 102 can be further processed by the subsequent baseband units, including a channel estimation unit 104 and a MIMO detection unit 106. In present day communications systems, the transmission rank typically is changed dynamically depending on radio propagation environment and/or signal to interference plus noise ratio (SINR) experienced by the receiver, while the number of received antennas M is fixed. A network-side entity, e.g., a base station, knows the number of receive antennas of the receiver during the connection setup and dynamically signals the transmission rank for current signal through control channel to the receiver, based on the measurement reports from the receiver, radio channel reciprocity or combination of both. The receiver decodes the control channel to determine the transmission rank of the current signal before detection starts.

The channel estimation unit 104 estimates MIMO propagation channel matrix F between M received signals and P antenna ports, using known pilot symbols transmitted together with data signals. The MIMO detection unit 106 uses the estimated propagation matrix, noise variance, received signal vector and transmission rank as inputs to generate LLRs (log likelihood ratios) for the binary bits associated with each of the N transmitted symbols, one symbol for a transmitted layer. The LLRs associated with a codeword are then passed to the channel decoding unit 108 which performs FEC decoding and CRC check. If CRC is good, the decoded information is further processed and an acknowledgement (ACK) is sent to the transmitter. Otherwise, a negative acknowledgement (NACK) request is sent to the transmitter for retransmission. The operations of different units are controlled by a baseband control unit 110 which, among other things, selects a detection algorithm most appropriate for detecting the current MIMO signal based on spatial correlation of MIMO propagation channel, SINR, power consumption, etc. The control unit may be, e.g., a digital signal processor (DSP) or a central processing unit (CPU) that controls each functional unit 102, 104, 106, 108, which may be implemented partly in hardware and partly in software.

Figure 2:
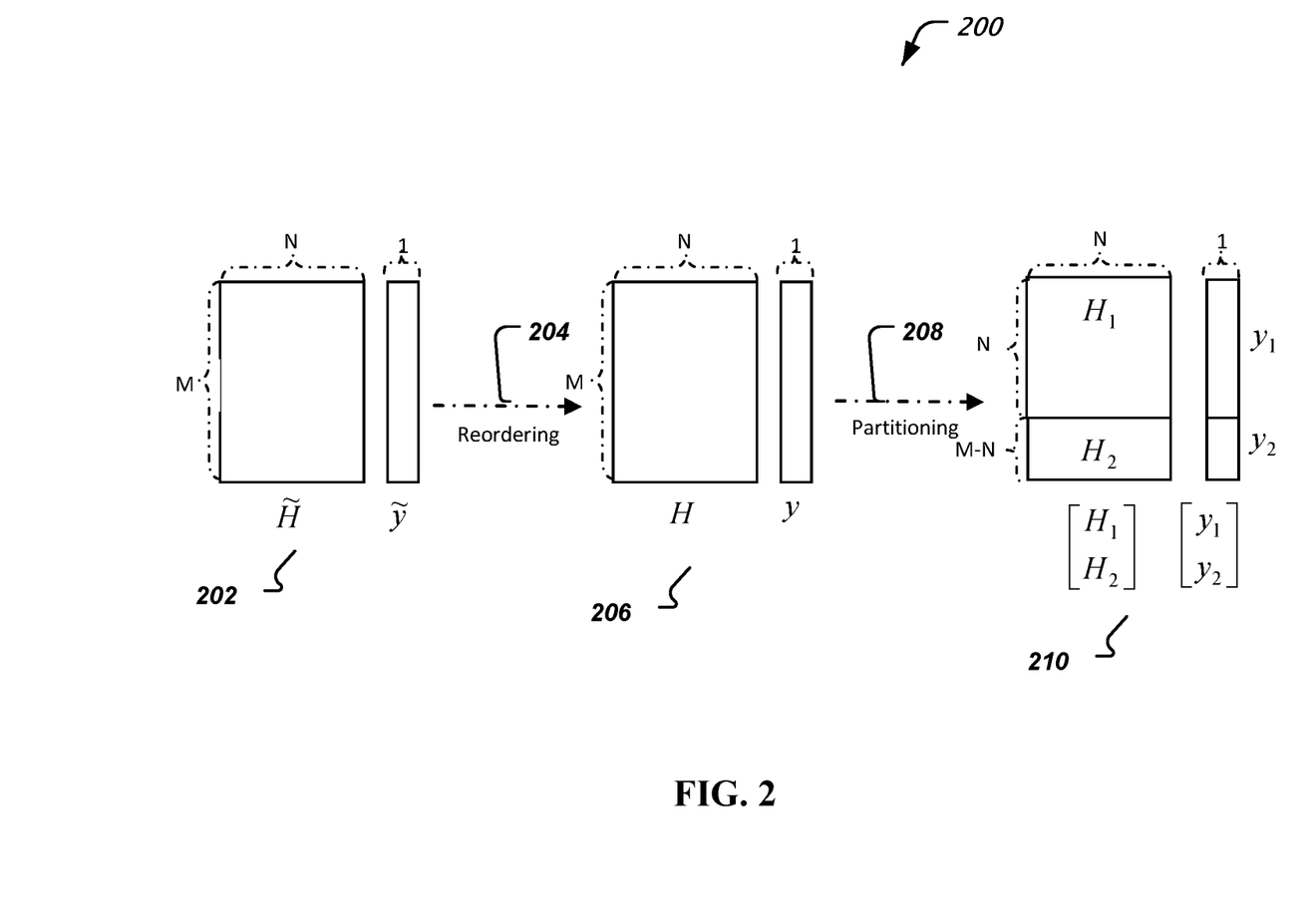
FIG. 2 shows an example of a process of reordering and partitioning over-determined MIMO system.

FIG. 2 illustrates an example process 200 of reordering (204) and partitioning (208) of an original over-determined MIMO system $\tilde{y}=\tilde{H}x+\tilde{n}$ with M equations/receive antennas and N layers, pictorially depicted as matrix multiplication blocks 202. Since the order of equations does not alter the performance of the MIMO system, the sequence of equations can be altered freely. Changing the order of equations corresponds to reordering the rows of $\tilde{H}$ and $\tilde{y}$. The reordered channel matrix and received vector are denoted as H and y, respectively, pictorially depicted as blocks 206. The goal of the reordering is to make the N×N sub-matrix corresponding to the first N equations of reordered MIMO system to have the largest possible determinant. The reordered channel matrix is then partitioned into an N×N square matrix $H_1$ and a (M−N)×N matrix $H_2$. Because the rank of channel matrix H is N, the rows of $H_2$ can be represented as linear combinations of the rows of $H_1$, or in matrix language $H_2=CH_1$ where C is a (M−N)×N matrix of coefficients representing the combinations. Similarly, the received signal vector y is partitioned in an N×1 vector $y_1$ and a (M−N)×1 vector $y_2$. These submatrices are pictorially depicted with blocks 210.

Figure 3:
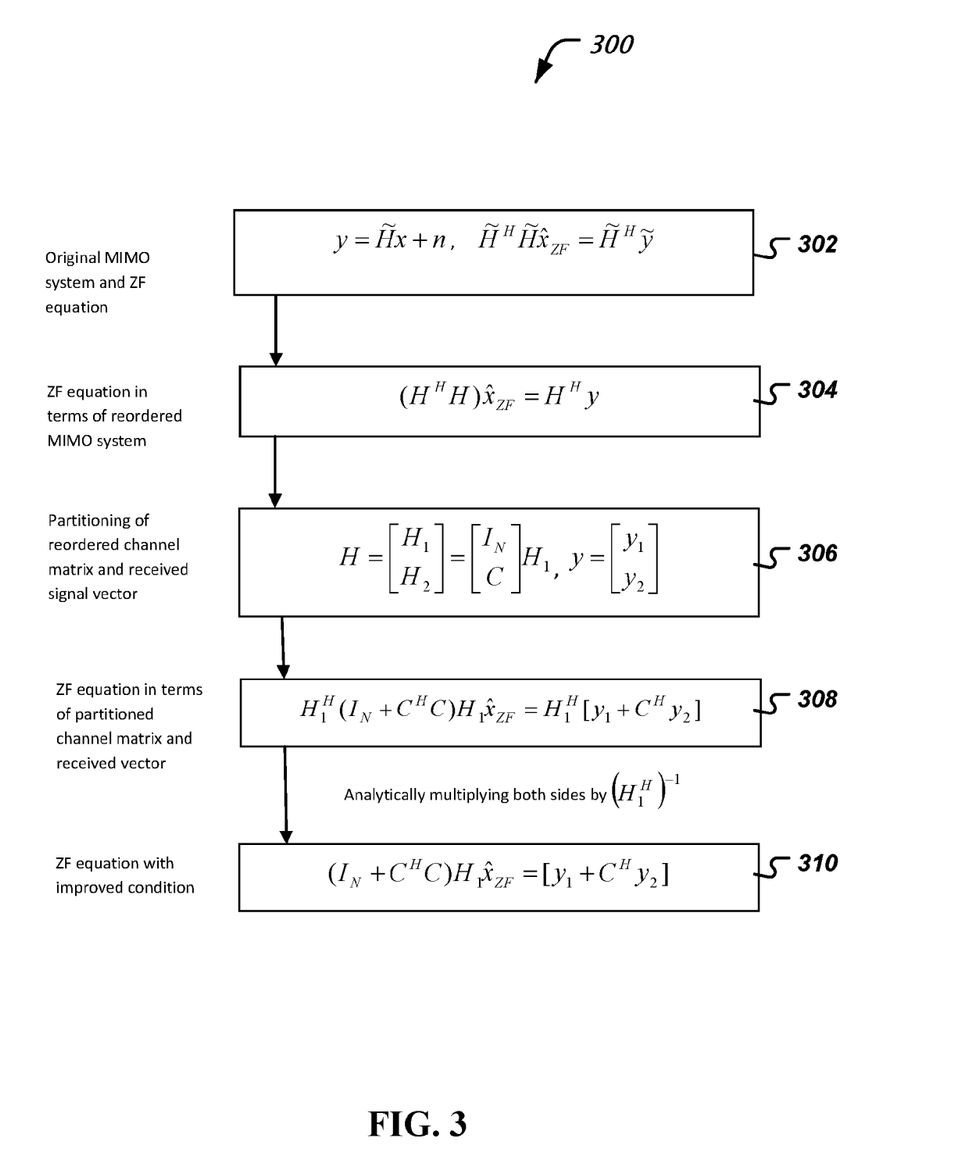
FIG. 3 shows an example of a process of improving matrix condition.

FIG. 3 illustrates a flowchart of an example method 300 of improving the condition of ZF equation $(\tilde{H}^H\tilde{H})\hat{x}_{ZF}=\tilde{H}^H\tilde{y}$ according to some embodiments of the present invention. The first box 302 shows the original MIMO system and the corresponding ZF equation. The second box 304 shows that, after reordering, the ZF equation is expressed in terms of reordered channel matrix and received signal vector. The third box 306 shows that the channel matrix and received signal vector are partitioned as follows, where $H_1$ is the best conditioned N×N sub-matrix out of all possible N×N sub-matrices of H:

$$H = \begin{bmatrix} H_1 \\ H_2 \end{bmatrix} = \begin{bmatrix} H_1 \\ CH_1 \end{bmatrix} = \begin{bmatrix} I_N \\ C \end{bmatrix} H_1; \quad \text{Eq. (11)}$$

$$y = \begin{bmatrix} y_1 \\ y_2 \end{bmatrix}.$$

The fourth box 308 shows the ZF equation expressed in terms of the partitioned channel matrix and received signal vector $$(H^H H)\hat{x}_{ZF} = \quad \text{Eq. (12)}$$

$$H^H y \Rightarrow H_1^H [I_N \quad C^H] \begin{bmatrix} I_N \\ C \end{bmatrix} H_1 \hat{x}_{ZF} = H_1^H [I_N \quad C^H] \begin{bmatrix} y_1 \\ y_2 \end{bmatrix} \Rightarrow$$

$$H_1^H (I_N + C^H C) H_1 \hat{x}_{ZF} = H_1^H (I_N + C^H y_2).$$

Since $H_1$ is non-singular, its inverse $(H_1^H)^{-1}$ exists. Multiplying both sides of the equation by $(H_1^H)^{-1}$, the ZF equation becomes $$(I_N + C^H C) H_1 \hat{x}_{ZF} = y_1 + C^H y_2, \quad \text{Eq. (13)}$$

which is shown in the fifth box 310. It will be appreciated that the representation of Eq. 13 improves the condition of the ZF equation because the matrix inverse is calculated analytically which does not cause any precision loss and because the condition of the ZF equation is now determined by the condition of $(I_N+C^HC)$ and of $H_1$. The matrix $(I_N+C^HC)$ is a better-conditioned matrix due to the identity matrix and $H_1$ is the best conditioned N×N sub-matrix, e.g., having the highest determinant value, out of all possible N×N sub-matrices of H.

Figure 4:
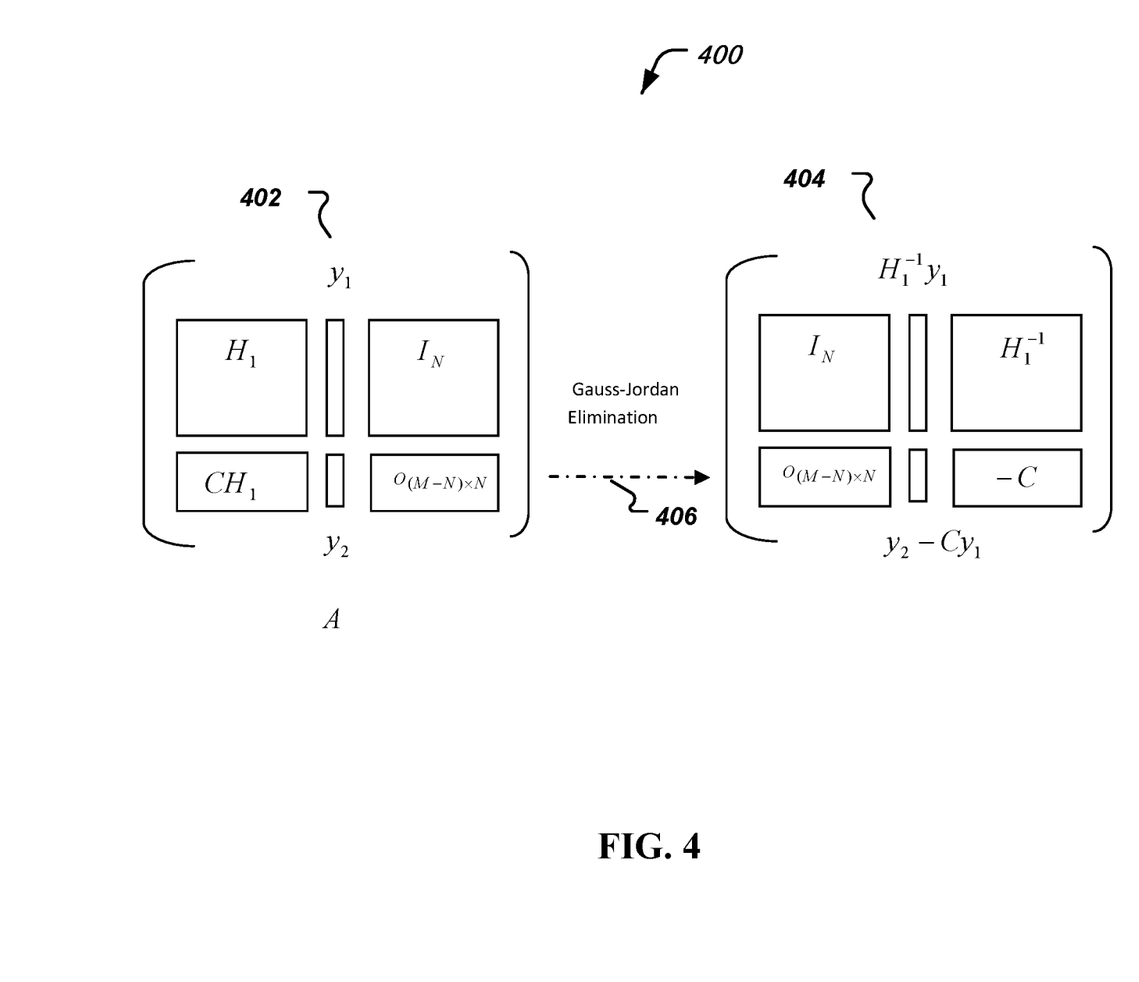
FIG. 4 shows an example of calculations for solving improved ZF equation.

FIG. 4 shows an exemplary method 400 for calculating C and $H_1^{-1}$. The matrix arrangement 402 shows an augmented block matrix whose first row consists of $H_1$, $y_1$ and identity matrix $I_N$ and whose second row consists of $H_2$, $y_2$ and a (M−N)×N zero-matrix $0_{(M-N)\times N}$. A Gauss-Jordan procedure 406 can be applied to the augmented matrix on the left which reduces $H_1$ to $I_N$ and $H_2$ to zero-matrix $0_{(M-N)\times N}$. At the same time, $y_1$ becomes $H_1^{-1}y_1$ and the upper-right identity matrix becomes $H_1^{-1}$, $y_2$ becomes $y_2-Cy_1$ and the lower-bottom zero-matrix becomes −C. Upon completing of Gauss-Jordan procedure, both the C matrix and the inverse of $H_1$ are available in the reduced augmented matrix 404. In some embodiments, e.g., the Gauss-Jordan procedure 406 may include performing a sequence of operations including swapping two rows, multiplying a row by a non-zero number and adding a non-zero multiple of one row to another row.

Figure 5:
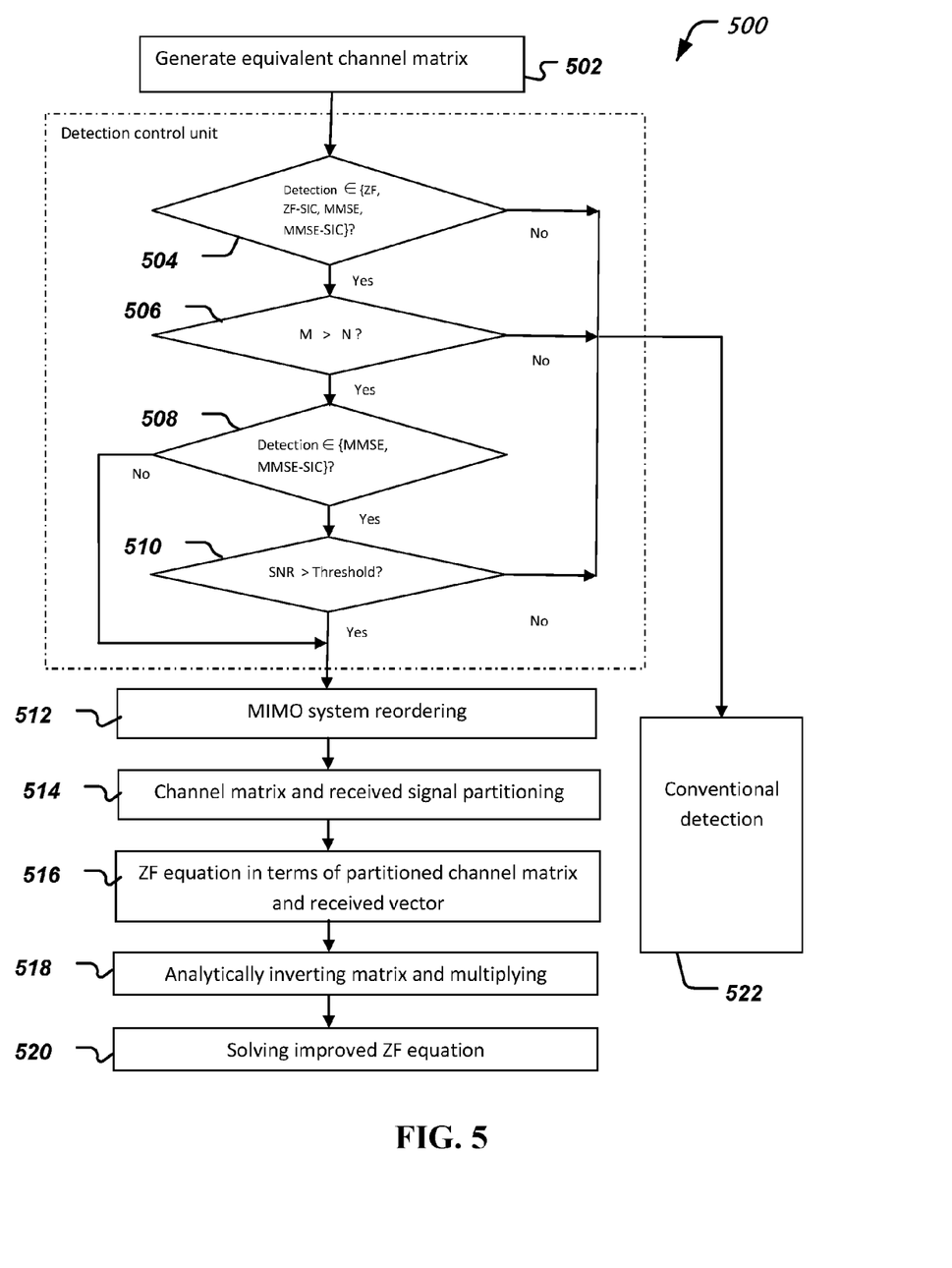
FIG. 5 shows an example flowchart of detection for over-determined MIMO system.

FIG. 5 shows a flowchart of an example method 500 of detecting spatially multiplexed signals according to some embodiments. After an equivalent channel matrix is generated (502), four possible checks will be conducted in detection control unit. At 504, a check is made if the selected detection algorithm is ZF, ZF-SIC, MMSE or MMSE-SIC. If not, a conventional detection method will be used (522). Otherwise check if the current MIMO channel is overdetermined by comparing the number of receive antennas M with the number of transmitted layers N (506). If M is not greater than N, conventional detection method will be used (522). If M>N, it is then checked if the detection algorithm is MMSE or MMSE-SIC (508), and if so whether the estimated SNR is above a predefined threshold (510); only when the SNR is above the threshold, the disclosed matrix row reordering (512) is applied, otherwise conventional detection method will be used. If the selected algorithm is ZF or ZF-SIC, the SNR comparison is not needed, and the disclosed matrix conditioning may be performed. Some embodiments of the disclosed detection method include reordering the MIMO system, partitioning the reordered MIMO channel matrix into an N×N sub-matrix and a (M−N)×N sub-matrix, and partitioning received signal vector into an N×1 vector and a (M−N)×1 vector (514), expressing the ZF equation in terms of partitioned channel matrix and partitioned received signal vector (516), multiplying both sides of the ZF equation by the inverse of the N×N sub-matrix (518) to obtain a better condition ZF equation and solving the ZF equation (520) to obtain a more accurate ZF estimate.

Figure 6:
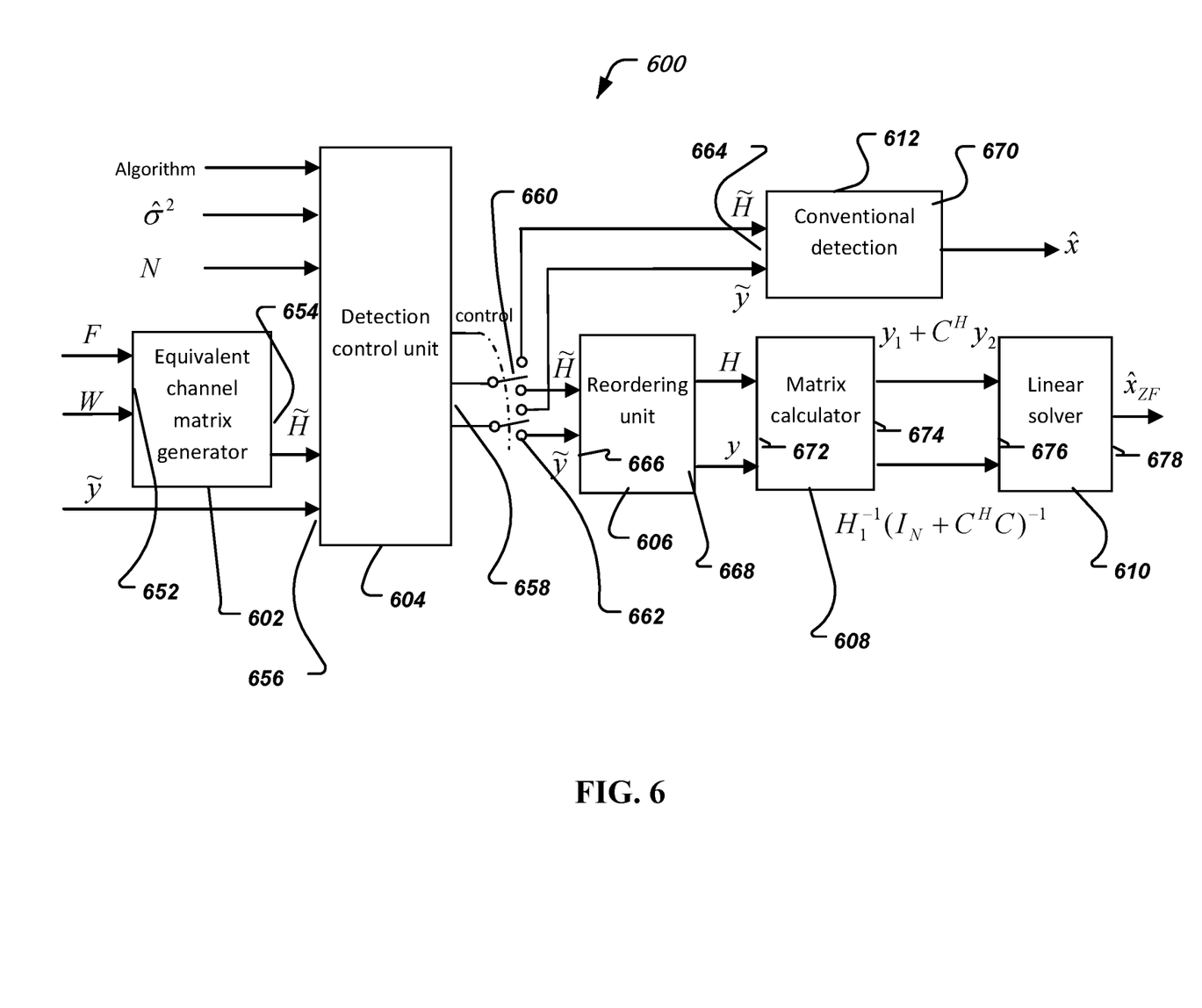
FIG. 6 shows an example block diagram of a detection unit.

FIG. 6 shows a block diagram of an example of an embodiment of a MIMO detection unit 600 comprising an equivalent channel matrix generator 602, a detection control unit 604, a reordering unit 606, a matrix calculator 608 and a linear solver 610. The equivalent channel matrix generator 602 generates an equivalent channel matrix $\tilde{H}$ using propagation channel matrix F and pre-coder matrix W as inputs. The equivalent channel matrix and received signal vector are passed to a detection control unit 604 which determines whether a conventional detection unit or a different version should be used for detecting the current received signal using the selected detection algorithm, estimated SNR and the number of transmitted layers as inputs. If a conventional detection unit 612 is to be used, then the equivalent channel matrix and received signal vector are routed to the conventional detection unit 612. If a modified detection unit is to be used, the equivalent channel matrix and received signal are forwarded to a reordering unit 606. The reordering unit generates reordered channel matrix H and reordered received signal vector y which are passed to the matrix calculator 608. The matrix calculator first computes the C matrix, the inverse of $H_1$ and then forms the matrix $H_1^{-1}(I_N+C^HC)^{-1}$ and vector $(y_1+C^Hy_2)$. The linear solver 610 solves the ZF equation to obtain the ZF estimate using the matrices from the matrix calculator as inputs.

In some embodiments, an apparatus for processing a spatially multiplexed signal is disclosed. One example embodiment is depicted in FIG. 6. The apparatus includes an equivalent channel matrix generator 602 that has an input interface 652 and an output interface 654. At the input interface 652, the equivalent channel matrix generator 602 receives a multiple-input-multiple-output (MIMO) propagation channel matrix F and a pre-coder matrix W. At the output interface 654, the equivalent channel matrix generator 602 outputs an equivalent channel matrix between the N transmitted signals (or layers) and the M received signals as the product of a MIMO propagation channel matrix F with a pre-coder matrix W. In an exemplary embodiment, the equivalent channel matrix generator can determine the channel matrix representing a result of multiplication of the MIMO propagation channel matrix F with the pre-coder matrix W.

The apparatus includes a detection control unit 604 having an input interface 656 and an output interface 658 wherein the input interface 656 of the detection control 604 unit is coupled to the output interface 654 of the equivalent channel matrix generator 602 and the output interface 658 of the detection control unit includes a first signal 660 that simultaneously toggles, depending on a transmission rank and a number of receive antennas, the outputs of the switch 662 between an input interface 664 of a conventional detection module 612 and an input interface 666 of a reordering unit 606. In an exemplary embodiment, the detection control unit 604 can determine the transmission rank and a number of receiver antennas.

Figure 7:
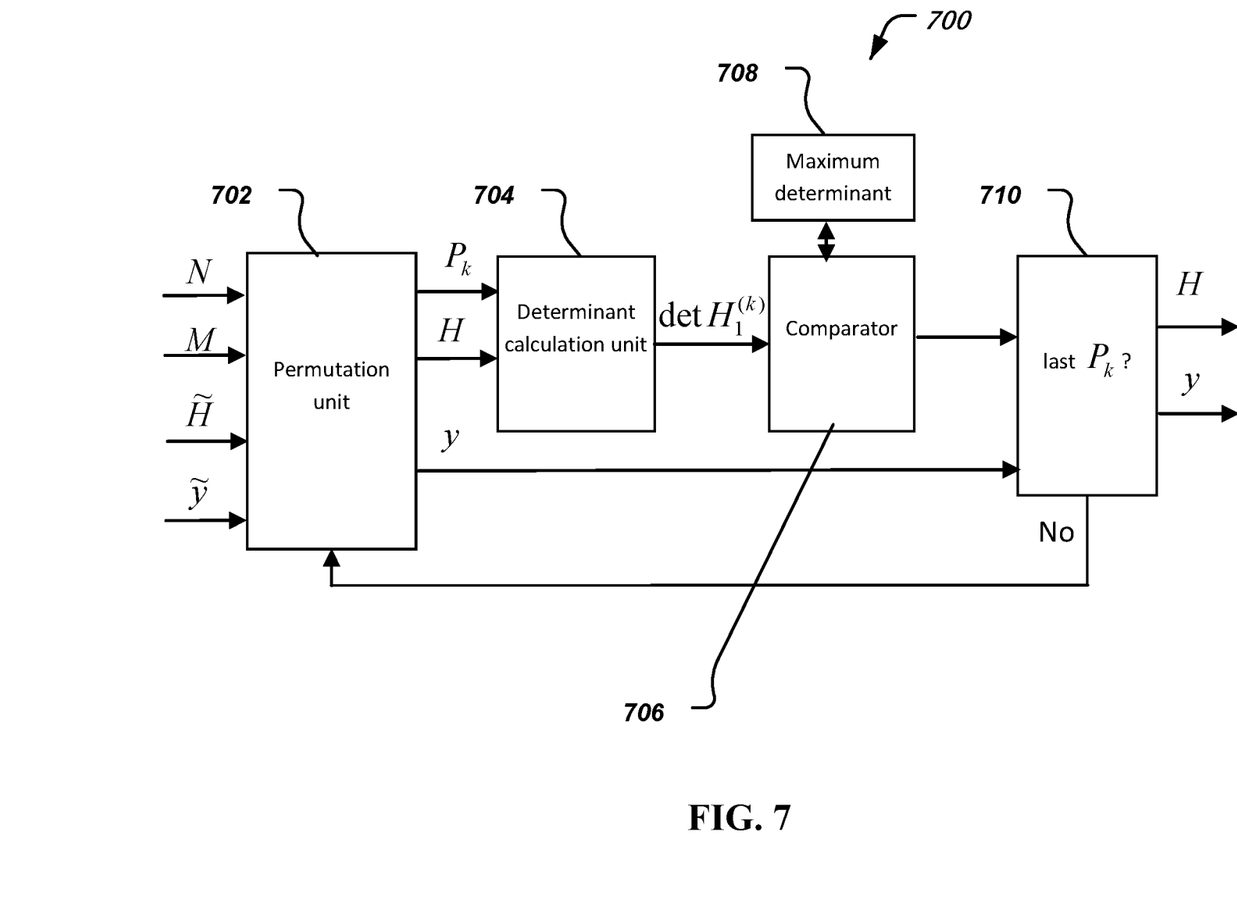
FIG. 7 depicts an example block diagram of a reordering unit.

The apparatus includes a reordering unit 606 having an input interface 666 coupled to the output interface 658 of the detection control unit 604 through the switch 662, and an output interface 668 that outputs a reordered channel matrix and a reordered received symbol vector. The reordering unit may include a permutation unit 702 for generating all different permutations of N out of M rows from the equivalent channel matrix, forming M!/(M −N)! different N×N sub-matrices, a determinant calculator for calculating determinants of all N×N sub-matrices corresponding to different row permutations, a comparator and a memory for storing the current maximum determinant value, where "!" represents the factorial operation. In an exemplary embodiment, the reordering unit can reorder the channel matrix and reorder received symbol vector.

The apparatus includes a conventional detection unit 612 having an input interface 664 coupled to the switch 662 and an output interface 670 on which results of detection are output, wherein the results of detection are calculated based on one of a maximum likelihood (ML) detection, linear detection and non-linear detection. In an exemplary embodiment, the conventional detection unit can calculate detection results based on either a maximum likelihood (ML) detection, or a linear detection, or a non-linear detection.

The apparatus includes a matrix calculator 608 having an input interface 672 coupled to the output interface 668 of the reordering unit; and an output interface 674 that carries inversion results for the reordered channel matrix and the reordered received symbol vector. In an exemplary embodiment, the matrix calculator can determine inversion results for the reordered channel matrix and the reordered received symbol vector.

The apparatus includes a linear solver 610 having an input interface 676 coupled to the output interface 674 of the matrix calculator and an output interface 678 carrying estimates of transmitted symbols obtained by a zero-forcing optimization algorithm. In an exemplary embodiment, the linear solver can estimate transmitted symbols obtained by an optimized zero-forcing algorithm.

In various embodiments, the switch 662 may operate to be responsive to, for minimum mean square error selection, estimated signal to noise ratio in the received signal. In an exemplary embodiment, the switch 662 can be a double-pole double throw switch that can be implemented using transistors. In some embodiments, the reordering unit 606 may be implemented as described with respect to FIG. 7.

FIG. 7 is a block diagram of an example of a MIMO system reordering unit 700 (e.g., similar to 512) which reorders the original MIMO system into an equivalent system y=Hx+n. The reordering unit 700 generates different permutations $P_k$ of N rows out of M rows of the original channel matrix (702). For each permutation $P_k$, a determinant calculator (704) calculates the determinant $\det H_1^{(k)}$ of the corresponding N×N sub-matrix $H_1^{(k)}$ which is compared (comparator 706) with the currently maximum determinant value (708). If $\det H_1^{(k)}$ is larger than the current maximum, it overwrites the maximum value and determinant of the next $H_1^{(k)}$ is computed, until all M!/(M−N)! permutations have been evaluated (710) and at this time the reordered channel matrix H and reordered received signal vector y are output from the reordering unit.

Figure 8:
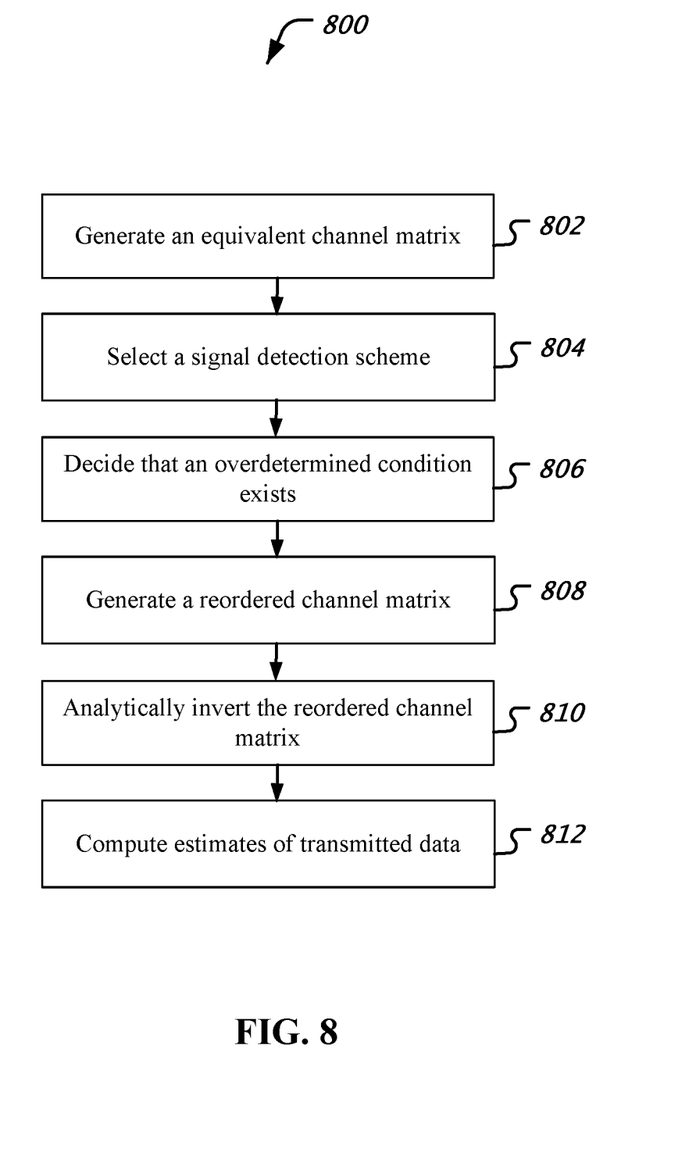
FIG. 8 shows an example flowchart of a method of wireless communication.

FIG. 8 shows a flowchart for an example method 800 implemented at a wireless receiver for processing a wireless signal transmission received at the multiple receiver antennas to recover transmitted data bits.

The method 800 includes generating an original equivalent channel matrix representative of a channel over which the wireless signal has traveled (802).

The method 800 includes selecting a signal detection scheme for recovering the transmitted data bits from the wireless signal transmission (804). In some embodiments, the decision may be taken by the control unit 110.

The method 800 includes deciding, selectively based on the selected signal detection scheme, an overdetermined condition for the wireless signal transmission such that the wireless signal transmission comprises fewer layers of transmission than the number of receiver antennas (806).

The method 800 includes reordering, when the wireless signal transmission is decided to be overdetermined, an equivalent channel matrix to generate a reordered channel matrix that is better conditioned for inversion than the (original) equivalent channel matrix (808). As described, in some embodiments, during the reordering operation, the equivalent channel matrix is reordered so that an N×N sub-matrix corresponding to first N rows of the reordered channel matrix has a largest determinant among all N×N sub-matrices of the reordered channel matrix and wherein the components of the received signal vector are reordered accordingly. In some embodiments, the method 800 may further include calculating the determinants of all possible N×N sub-matrices of the equivalent channel matrix, where the reordering results in a sub-matrix that has the largest determinant to occupy a top left position within the reordered channel matrix.

The method 800 includes analytically inverting the reordered channel matrix to generate a mathematically equivalent and numerically better conditioned new ZF equation (810). In some embodiments, during the reordering operation, the equivalent channel matrix is reordered so that an N×N sub-matrix corresponding to first N rows of the reordered channel matrix has a largest determinant among all N×N sub-matrices of the reordered channel matrix and wherein components of the received signal vector are reordered accordingly. In some embodiments, determinants of all possible N×N sub-matrices of the equivalent channel matrix may be calculated and the reordering results in a top N×N sub-matrix having the largest determinant from among all possible N×N sub-matrices. As described elsewhere in this document, the method 800 includes applying Gauss-Jordan procedure to an augmented matrix to obtain C matrix and computing an inverse of $H_1$.

The method 800 includes computing estimates of transmitted data bits using the inverted channel matrix (812). In some embodiments, the computation may be performed by partitioning the reordered channel matrix and a corresponding received signal vector representing symbols received from the wireless signal transmission, improving a numerical condition of the ZF equation by using the partitioned reordered channel matrix, and solving the ZF equation to obtain the estimates of transmitted data bits.

The method 800 may be embodied into instructions that are stored in a memory of a wireless receiver fitted with multiple receiver antennas and a processor that can execute the instructions to implement the method.

In some embodiments, the reordering includes partitioning the reordered channel matrix is partitioned into an N×N sub-matrix $H_1$ and a (M−N)×N matrix $H_2$ and wherein the rows of $H_2$ are linear combinations of rows of $H_1$ so that $H_2 = CH_1$, wherein C is a coefficient matrix representing the combinations. In some embodiments, a Gauss-Jordan procedure is applied to an augmented matrix to obtain both the C matrix and the inverse of $H_1$.

In some embodiments, as described herein, the numerical condition improvement is obtained by expressing a zero-forcing equation using a partitioned reordered channel matrix and the corresponding received signal vector.

Figure 9:
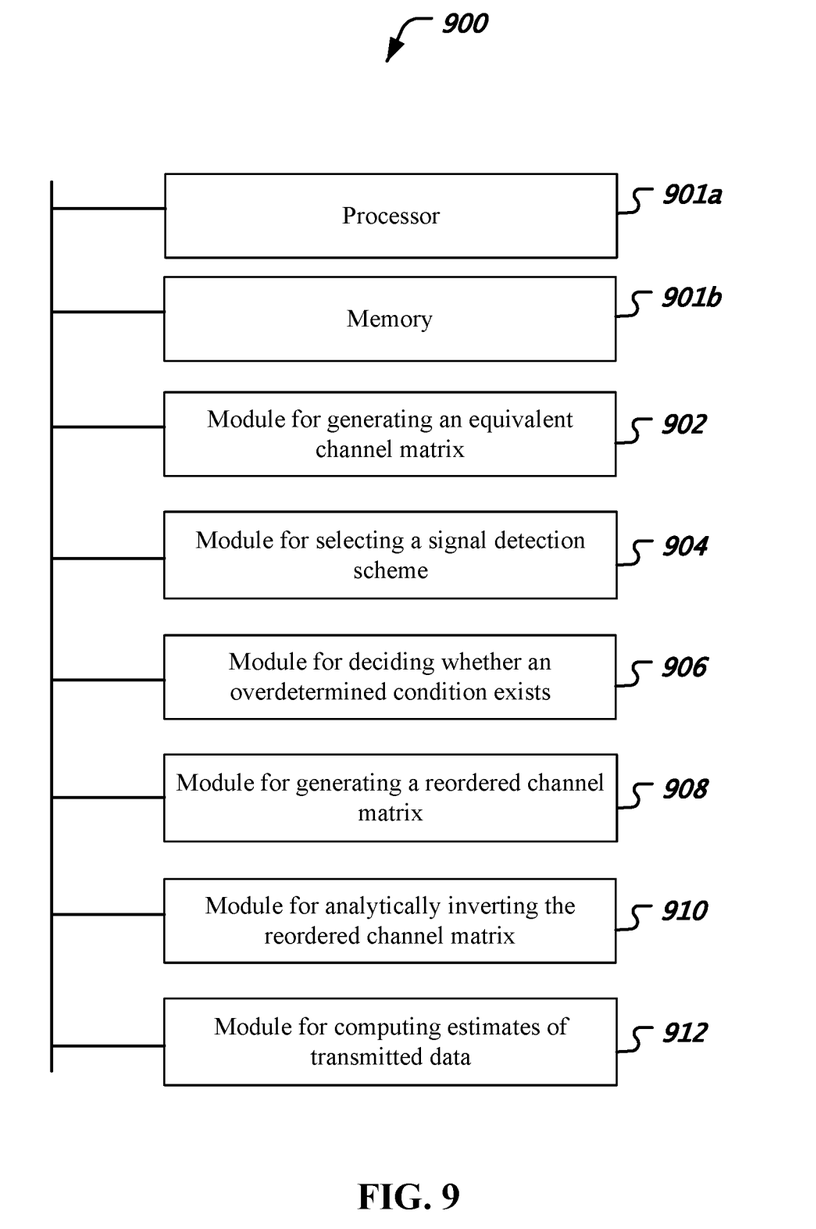
FIG. 9 shows a block diagram of a wireless communication apparatus.

FIG. 9 shows a block diagram example of a wireless communication apparatus 900. The apparatus 900 may implement a method described with respect to the method 800. The apparatus 900 includes a processor 901a coupled to a memory 901b. The memory 901b can store instructions that when executed by the processor 901a, cause the processor 901a to process signal received at the multiple receiver antennas to recover transmitted data bits. The apparatus 900 includes a module 902 for generating an equivalent channel matrix representative of a channel over which the wireless signal transmission has traveled; a module 904 for selecting a signal detection scheme for use in recovering the transmitted data bits from the wireless signal transmission, a module 906 for deciding an overdetermined condition for the wireless signal transmission such that the wireless signal transmission comprises more layers of transmission than the number of receiver antennas, a module 908 for reordering, when the wireless signal transmission is decided to be overdetermined, the equivalent channel matrix to generate a reordered channel matrix that is better conditioned for inversion than the equivalent channel matrix, a module 910 for analytically inverting the reordered channel matrix to generate an inverted channel matrix, and a module 912 for computing estimates of transmitted data using the inverted channel matrix.

Some embodiments disclosed in the present document can be described using the following exemplary embodiments:

In a first exemplary embodiment, a method, implemented at a receiver of wireless communication of improving detection performance by improving matrix condition for over-determined MIMO systems, comprising: reordering original MIMO system to obtain a reordered channel matrix and a reordered received signal vector, partitioning the reordered channel matrix and the corresponding received signal vector, improving the condition of the Zero-Forcing equation by using partitioned channel matrix and solving the ZF equation to obtain a more accurate estimate of transmitted symbol vector.

The method of the first exemplary embodiment, wherein the performance of ZF and ZF-SIC detection is improved for all SNR values by improving the condition of ZF equation.

The method of the first exemplary embodiment, wherein the performance of MMSE and MMSE-SIC detection is improved by improving the condition of ZF equation at high SNR.

The method of the first exemplary embodiment, wherein the original MIMO system is reordered so that the N×N sub-matrix corresponding to the first N rows of the reordered channel matrix has the largest determinant among all N×N sub-matrices of the reordered channel matrix and wherein the components of the received signal vector are reordered accordingly.

The method of the exemplary embodiment in the above paragraph, wherein the N×N sub-matrix $H_1$ is computed by calculating the determinants of all possible N×N sub-matrices of the equivalent channel matrix and choosing the sub-matrix that has the largest determinant.

The method of the first exemplary embodiment, wherein the reordered channel matrix is partitioned into an N×N sub-matrix $H_1$ and a (M−N)×N matrix $H_2$ and wherein the rows of $H_2$ are linear combinations of rows of $H_1$ so that $H_2 = CH_1$.

The method of the first exemplary embodiment, wherein Gauss-Jordan procedure is applied to an augmented matrix to obtain C matrix and the inverse of $H_1$.

The method of the first exemplary embodiment, wherein a better conditioned ZF equation is obtained by expressing the ZF equation in terms of the reordered and partitioned channel matrix and the corresponding received signal vector, and analytically multiplying both sides of the ZF equation by the inverse of $(H_1^H)$ so that the condition of the ZF equation is determined by the best conditioned sub-matrix $H_1$.

In a second exemplary embodiment, an apparatus for detecting spatially multiplexed signal for over-determined MIMO systems, comprising an equivalent channel matrix generator, a detection control unit, a reordering unit, a matrix calculator and a linear solver.

The apparatus of the second exemplary embodiment, wherein the equivalent channel matrix generates channel matrix between M received signals and N transmitted layers by multiplying MIMO propagation channel matrix F with a pre-coder matrix W.

The apparatus of the second exemplary embodiment, wherein the detection control unit determines whether the proposed detection unit or the conventional detection unit shall be used to detect the current received signal based on transmission rank, number of receive antennas, selected detection algorithm and, for MMSE-based detection, estimated SNR.

The apparatus of the second exemplary embodiment, wherein the reordering unit comprises a permutation unit for generating all different permutations of N out of M rows from the equivalent channel matrix, forming M!/(M−N)! different N×N sub-matrices, a determinant calculator for calculating determinants of all N×N sub-matrices corresponding to different row permutations, a comparator and a memory for storing the current maximum determinant value.

The various input and output interfaces described in this document may be implemented as application programmer's interface (APIs), conductive busses (e.g., chip pins and metal traces) carrying electrical signals, and/or a combination thereof.

It will be appreciated that techniques for improving the performance of signal reception in an over-determined wireless communication system are disclosed.

In some disclosed embodiments, an overdetermined channel matrix is processed to improve its condition before matrix inverting. The improvement is achieved by determining a submatrix having the largest determinant, and by reordering received symbol vector and rows of the channel matrix such that the sub-matrix with the largest determinant occupies top portion of the reordered channel matrix. Furthermore, in some embodiments, this reordering may be done based on the measured signal to noise ratio in the system and whether or not the reordering and conditioning of the matrix may result in an improvement in the symbol detection process. For example, when MMSE detection scheme is to be used, the reordering is performed upon the SNR meeting a threshold of operation.

It will further be appreciated that methods and apparatus of obtaining better detection performance by improving matrix condition for an M×N over-determined MIMO system $\tilde{y} = \tilde{H}x + \tilde{n}$ are disclosed. The condition of matrix $\tilde{H}^H\tilde{H}$ that needs to be inverted for solving various detection problems is improved by reordering the M equations of the original MIMO system, resulting in a reordered channel matrix H and reordered received signal vector y so that the N×N sub-matrix $H_1$, which corresponds to the first N rows of H, has the largest determinant among all N×N sub-matrices of H, partitioning the reordered channel matrix into $H_1$ and $H_2$, and partitioning the reordered received signal vector y into $y_1$ and $y_2$, forming ZF equation in terms of the partitioned channel matrix and partitioned received signal vector, analytically multiplying both sides of the ZF equation by $(H_1^H)^{-1}$ to improve the condition of the ZF equation, and solving the ZF equation to obtain a more accurate estimate of the transmit symbol vector.

The disclosed and other embodiments, modules, units, and the functional operations described in this document (e.g., the equivalent channel matrix generator, the detection control unit, the switch, the reordering unit, the matrix calculator, the conventional detection module, the linear solver, the permutation unit, the determinant calculation unit, the comparator, the maximum determinant module, and the decision module 710) can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A method, implemented by a wireless receiver having multiple receiver antennas for processing a wireless signal transmission received at the multiple receiver antennas to recover transmitted data bits, comprising:
    generating an equivalent channel matrix representative of a channel over which the wireless signal transmission has traveled;
    selecting a signal detection scheme used for recovering the transmitted data bits from the wireless signal transmission;
    deciding, selectively based on the selected signal detection scheme, an overdetermined condition for the wireless signal transmission such that the wireless signal transmission comprises fewer layers of transmission than a number of the multiple receiver antennas;
    reordering, when the wireless signal transmission is decided to be overdetermined, the equivalent channel matrix to generate a reordered channel matrix that is better conditioned for inversion than the equivalent channel matrix;
    analytically inverting the reordered channel matrix to generate an inverted channel matrix; and
    computing estimates of the transmitted data bits using the inverted channel matrix.

2. The method of claim 1, wherein the computing the estimates of the transmitted data bits includes:
    partitioning the reordered channel matrix and a corresponding received signal vector representing symbols received from the wireless signal transmission;
    improving a numerically conditioned new Zero-Forcing (ZF) equation by using the partitioned reordered channel matrix, wherein the ZF equation is characterized by the inverted channel matrix $H_1^{-1}(I_N+C^HC)^{-1}$, $\hat{x}_{ZF}$, and $(y_1+C^Hy_2)$ where $I_N$ is an identity matrix, C is a coefficient matrix, $H_1$, is the partitioned reordered channel matrix, $\hat{x}_{ZF}$ is an estimate of a transmitted data bit, and $y_1$, and $y_2$, are partitioned received signal vectors; and
    solving the ZF equation to obtain the estimates of the transmitted data bits.

3. The method of claim 2, wherein during the reordering, the equivalent channel matrix is reordered so that an N×N sub-matrix corresponding to first N rows of the reordered channel matrix has a largest determinant among all N×N sub-matrices of the reordered channel matrix, wherein components of the received signal vector are reordered to correspond to the reordered channel matrix, and wherein N represents a number of transmitted layers.

4. The method of claim 3, further comprising:
calculating determinants of all possible N×N sub-matrices of the equivalent channel matrix; and
wherein the reordering results in a top N×N sub-matrix having a largest determinant from among all possible N×N sub-matrices.

5. The method of claim 2, wherein the improving the numerically conditioned new ZF equation includes:
obtaining the ZF equation by expressing the ZF equation in terms of the partitioned reordered channel matrix and the corresponding received signal vector.

6. The method of claim 5, further comprising:
analytically multiplying both sides of the ZF equation by an inverse of $H_1^H$ so that the condition of the ZF equation is determined by a condition of a sub-matrix $H_1$, wherein $H_1$ represents a sub-matrix of the reordered channel matrix having a largest determinant from among all possible N×N submatrices, wherein N represents a number of transmitted layers.

7. The method of claim 1, wherein the reordering includes partitioning the equivalent channel matrix into an N×N sub-matrix $H_1$ and a (M−N)×N sub-matrix $H_2$ and wherein rows of $H_2$ are linear combinations of rows of $H_1$ so that $H_2$ =$CH_1$, wherein C is a coefficient matrix representing the linear combinations, and wherein N represents a number of transmitted layers, and M represents a number of received signals or a number of receive antennas.

8. The method of claims 7, further comprising:
applying Gauss-Jordan procedure to an augmented matrix to obtain the C coefficient matrix; and
computing an inverse of $H_1$.

9. An apparatus for processing a spatially multiplexed signal comprising a number of transmitted layers, N, in an over-determined multiple-input-multiple-output (MIMO) system, comprising:
an equivalent channel matrix generator having inputs and an output, wherein, at the inputs, the equivalent channel matrix generator is configured to receive a MIMO propagation channel matrix F and a pre-coder matrix W, and wherein, at the output, the equivalent channel matrix generator is configured to output an equivalent channel matrix representing a result of multiplication of the MIMO propagation channel matrix F with the pre-coder matrix W;
a detection control circuit having a first input, second inputs, and an output, wherein
the first input of the detection control circuit is coupled to the output of the equivalent channel matrix generator,
the second inputs of the detection control circuit are configured to receive the number of transmitted layers, N, the spatially multiplexed signal, and a signal to noise ratio estimate of the spatially multiplexed signal, and
the output of the detection control circuit is coupled to a switch, and configured to include a signal that toggles the switch, depending on a transmission rank and a number of receiver antennas, to simultaneously couple outputs of the switch between a first input of a conventional detection circuit and a first input of a reordering circuit;
the reordering circuit having the first input and a second input coupled to the output of the detection control circuit through a first set of outputs of the switch, and outputs that are configured to output a reordered channel matrix and a reordered received symbol vector;
the conventional detection circuit having the first input and a second input coupled to the output of the detection control circuit through a second set of outputs of the switch and an output configured to output detection results that are calculated based on one of a maximum likelihood (ML) detection, linear detection, or non-linear detection;
a matrix calculator having inputs coupled to the outputs of the reordering circuit, and outputs that are configured to carry inversion results for the reordered channel matrix and the reordered received symbol vector; and
a linear solver having inputs coupled to the outputs of the matrix calculator, and an output configured to carry estimates of transmitted symbols obtained by an optimized zero-forcing algorithm.

10. The apparatus of claim 9 wherein the switch is responsive to, for minimum mean square error selection, the signal to noise ratio estimate of the spatially multiplexed signal.

11. The apparatus of claim 9, wherein the reordering circuit comprises:
a permutation circuit that is configured to generate all different permutations of N out of M rows from the equivalent channel matrix, forming M!/(M−N)! different N×N sub-matrices, wherein N represents the number of transmitted layers, and wherein M represents a number of received signals or a number of receive antennas, where ! denotes a factorial operation;
a determinant calculator configured to calculate determinant values of all N×N sub-matrices corresponding to different row permutations;
a comparator configured to compare determinant values; and
the reordering circuit configured to store a current maximum determinant value of the determinant values.

12. A wireless communication apparatus, comprising:
multiple receiver antennas;
a memory; and
a processor coupled to the memory wherein the memory stores instructions that when executed, cause the processor to process signals received at the multiple receiver antennas to recover transmitted data bits, the instructions comprising:
instructions for generating an equivalent channel matrix representative of a channel over which a wireless signal transmission has traveled;
instructions for selecting a signal detection scheme used for recovering the transmitted data bits from the wireless signal transmission;
instructions for deciding, selectively based on the selected signal detection scheme, an overdetermined condition for the wireless signal transmission such that the wireless signal transmission comprises fewer layers than a number of the multiple receiver antennas;
instructions for reordering, when the wireless signal transmission is decided to be overdetermined, the equivalent channel matrix to generate a reordered channel matrix that is better conditioned for inversion than the equivalent channel matrix;
instructions for analytically inverting the reordered channel matrix to generate an inverted channel matrix; and
instructions for computing estimates of the transmitted data bits using the inverted channel matrix.

13. The apparatus of claim 12, wherein the instructions for computing the estimates comprise:

instructions for partitioning the reordered channel matrix and a corresponding received signal vector representing symbols received from the wireless signal transmission;

instructions for improving a numerical condition of a Zero-Forcing (ZF) equation by using the partitioned reordered channel matrix, wherein the ZF equation is characterized by the inverted channel matrix $H_1^{-}(I_N+C^HC)^{-1}$, $\hat{x}_{ZF}$, and $(y_1+C^Hy_2)$, where $I_N$ is an identity matrix, C is a coefficient matrix, $H_1$, is the partitioned reordered channel matrix, $\hat{x}_{ZF}$ is an estimate of a transmitted data bit, and $y_1$ and $y_2$ are partitioned received signal vectors; and instructions for solving the ZF equation to obtain the estimates of the transmitted data bits.

14. The apparatus of claim 13, wherein the instructions for reordering comprise instructions for reordering the equivalent channel matrix so that an N×N sub-matrix corresponding to first N rows of the reordered channel matrix has a largest determinant among all N×N sub-matrices of the reordered channel matrix and wherein components of the received signal vector are reordered to correspond to the reordered channel matrix, wherein N represents a number of transmitted layers.

15. The apparatus of claim 14, wherein the instructions further comprise:

instructions for calculating determinants of all possible N×N sub-matrices of the equivalent channel matrix; and wherein the reordering results in a sub-matrix that has the largest determinant to occupy a top left position within the reordered channel matrix.

16. The apparatus of claim 13, wherein the instructions for improving the numerical condition comprises:

instructions for obtaining the ZF equation by expressing the ZF equation in terms of the partitioned reordered channel matrix and the corresponding received signal vector.

17. The apparatus of claim 16, wherein the instructions further comprise:

instructions for analytically multiplying both sides of the ZF equation by an inverse of $H_1^H$ so that the condition of the ZF equation is determined by a condition of a sub-matrix $H_1$, wherein $H_1$ represents a sub-matrix of the reordered channel matrix having a largest determinant from among all possible square submatrices, wherein N represents a number of transmitted layers.

18. The apparatus of claim 12, wherein the instructions for reordering comprise instructions for partitioning the reordered channel matrix into an N×N sub-matrix $H_1$ and a (M−N)×N matrix $H_2$ and wherein rows of $H_2$ are linear combinations of rows of $H_1$ so that $H_2 = CH_1$, wherein C is a coefficient matrix that represent the linear combinations, wherein N represents a number of transmitted layers, and wherein M represents a number of received signals or a number of receive antennas.

19. The apparatus of claims 18, wherein the instructions further comprise:

instructions for applying a Gauss-Jordan procedure to an augmented matrix to obtain the C coefficient matrix; and instructions for computing an inverse of $H_1$.

* * * * *